United States Patent [19]
Oshima et al.

[11] 3,922,414
[45] Nov. 25, 1975

[54] FORM COMPOSITE STRUCTURES

[75] Inventors: Keisuke Oshima; Takaya Yasumoto, both of Otsu; Michiaki Higashikuze, Takatsuki; Masanari Kawamoto, Otsu, all of Japan

[73] Assignee: Toray Industries, Inc., Tokyo, Japan

[22] Filed: Aug. 30, 1973

[21] Appl. No.: 393,146

[30] Foreign Application Priority Data
Sept. 7, 1972  Japan.................................. 47-89080

[52] U.S. Cl. ..................... 428/130; 106/75; 156/79; 428/121; 428/192; 428/312; 428/313; 428/432; 428/450; 181/33 G
[51] Int. Cl.² ........................ B32B 3/04; B32B 5/18
[58] Field of Search .......... 106/75; 161/41, 99, 100, 161/109, 113, 108, 159, 160, 89, 161, 207, 94, 213, 403; 181/33 G; 117/123 B, 135.1

[56] References Cited
UNITED STATES PATENTS

| | | | |
|---|---|---|---|
| 3,097,124 | 7/1963 | Denenberg | 161/113 |
| 3,268,350 | 8/1966 | Grebe et al. | 106/75 |
| 3,484,331 | 12/1969 | Betz | 161/100 X |
| 3,630,310 | 12/1971 | Federer | 181/33 G |
| 3,770,560 | 11/1973 | Elder | 161/159 X |
| 3,785,103 | 1/1974 | Turner | 161/161 X |

FOREIGN PATENTS OR APPLICATIONS

| | | | |
|---|---|---|---|
| 904,509 | 8/1962 | United Kingdom | 106/75 |

OTHER PUBLICATIONS

*Perry's Chemical Engineers' Handbook*, Perry, Robert H., Chilton, Cecil H, & Kirkpatrick, Sidney D., (New York: 1963) McGraw-Hill.

*Primary Examiner*—George F. Lesmes
*Assistant Examiner*—Alan I. McDonald

[57] ABSTRACT

A foam composite structure possessing the characteristics needed for use in constructions is obtained at low cost by heat foaming a piled up formation of an alkaline silicate layer and metal sheet or a metal sheet/alkaline silicate layer/metal sheet configuration.

6 Claims, 2 Drawing Figures

FORM COMPOSITE STRUCTURES

SUMMARY OF THE INVENTION

The present invention relates to a foam composite structure of alkaline silicate possessing properties of higher mechanical strength, lower thermal conductivity, higher sound transmission loss, light weight, fire resistance, thermal stability, and non-flammability which can be produced at low cost.

Sodium silicate foam has been under discussion for a long time because of certain of its characteristics which are desirable for architectural use, its being light weight, having lower thermal conductivity, is non-flammable, etc. It, however, has not yet been mass-produced commercially, since heretofore it has not been known how to overcome the fundamentally low impact strength and low bending strength of sodium silicate foam which are necessary for architectural materials on which heavy stresses act, not only at the time of transportation and construction, but also after construction. More particularly sodium silicate foam at low density is so brittle that its surface is easily crumbled when scratched. While sodium silicate can be effectively formed into board which is light weight, has low thermal conductivity and is non-flammable, it is not only difficult, but is impractical to form it into a thin, large board since ordinary sodium silicate foam is so weak. In the past, brittle materials have been reinforced by mixing fibrous material with it or by adhering flexible board, paper or cloth to it. These methods have been found to be inadequate and in the method of adhering flexible boards to the foam, particularly many undesirable characteristics and defects exist, some of which are as follows.

1. A great deal of adhesive is required to adhere the board and the foam because the surface of the foam is generally porous and the adhesive is ordinary liquid. Hence, the curing and drying time of the adhesive is slow.
2. Ordinarily effective adhesives are organic substances, and this, in conjunction with the amount of adhesive required, causes a loss in thermal stability, fire resistance, and non-flammability.
3. The numerous operations and amount of equipment needed for coating the adhesive, piling up the foam with facing materials, pressing these and curing the adhesive, is very expensive.
4. Even with high mechanical strength of facing materials in many cases the mechanical strength of a layer of the adhesion is not sufficiently high for construction materials.
5. In many cases because of the weakness of the alkaline silicate foam destructions occur in the adhesion operation in many cases.

As mentioned above, it has been impossible heretofore to produce inexpensively and by a simplified method a material having satisfactory properties for use as architectural materials from the sodium silicate foam and flexible facing materials.

OBJECTS OF THE INVENTION

It is an object of the present invention to provide the composite structure of alkaline silicate foam possessing the properties of higher mechanical strength, lower thermal conductivity, higher sound transmission loss, light weight, fire resistance, thermal stability, and non-flammability at a lower cost.

Another object of the present invention is to provide a method to facilitate the general handling of the foam of sodium silicate, such as removing the product from the production equipment, when transporting and depositing it into the warehouse and during construction.

Still another object of the present invention is to provide a method of improving the release properties of the foam of alkaline silicate from moulders or from the mechanisms which readjust the foam into the board shape during the foaming process.

These and other objects of the present invention are attained in the following manner.

On the occasion of foaming alkaline silicate by heating, alkaline silicate, whose molar ration of $SiO_2/R_2O$ (R: Na and/or K) is 4–8 and whose water content is 20–170% at dry base, and metal sheet, in a thickness of 0.05–5 mm and linear thermal expansion coefficient of $5 \times 10^{-6} – 20 \times 10^{-6} \, °C^{-1}$, are stacked into the formation of metal sheet/alkaline silicate layer, or metal sheet/alkaline silicate layer/metal sheet.

By utilizing the above process in the reinforcement of brittle board:

1. Less equipment and adhesion time is needed;
2. The desirable characteristics of alkaline silicate such as fire resistance, thermal stability, non-flammability, etc. are retained as the result of not using organic adhesive;
3. Ease and efficiency in handling with few destructions occurring during production and construction is achieved as a result of the foam being reinforced during production; and
4. After production of the alkaline silicate foam is completed, release of the AS foam from moulds is very easy and no problems are presented.

Figure 1:
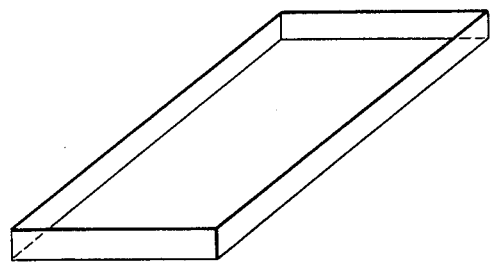
FIG. 1, represents a layered article of the present invention.

In the present invention, $SiO_2/R_2O$ molar ratio of alkaline silicate is 4–8, preferably 4.5–7, and when this molar ratio becomes lower than 4, the water or moisture resistance of the product becomes poor and useless. On the other hand, when this molar ratio becomes higher than 8, the properties of expansion of raw material becomes poor and low density foam cannot be produced.

Also, in the present invention, water content in the raw material of the foam is 20–170% at dry base, and when this water content becomes lower than 20%, the properties of expansion of raw material becomes poor and low density foam cannot be produced too. On the other hand, when the water content becomes higher than 170%, especially in the case of lower molar ratio of $SiO_2/R_2O$, viscosity of raw material of foam becomes so low that it is hard to pile up raw material of foam into layers onto the metal sheet.

In the present invention, alkaline silicate is preferably reacted as perfect alkaline silicate; however, dispersion of siliceous powder in the alkaline silicate or mixture of siliceous powder and alkaline hydroxide, alkaline oxide and/or alkaline carbonate are useful for the present invention.

The aforementioned siliceous powders include silicic acids, such as ortho-silicic acid, meta-silicic acid, di-silicic acid, tri-silicic acid, and tetra-silicic acid etc., diatomaceous earth, amorphous silica produced from natural resources, white carbon commercially produced and tiny particles of powder produced as a by-product of few silicon, metal silicon or carbonundum production. For these reasons, it is possible to use the mixtures of said siliceous powder with a commercially produced soluble alkaline silicate.

In the present invention, it is possible to add the other materials into the raw material of the foam within the limit of 30% per total solid content in the raw material and within the range of which properties of foam or foam composite structure do not become inferior.

In the present invention, it is especially important to use a metal sheet in the thickness of 0.05–5 mm and linear thermal expansion coefficient of $5 \times 10^{-6}$–$20 \times 10^{-6}$ per C°, The reason for this will become clear from the following.

When the thickness of the sheet becomes thinner than 0.05 mm, the metal sheet is so weak that the foam composite structure of this metal sheet with the alkaline silicate foam is not strong enough to be useful as construction material. However, when the thickness of metal sheet becomes thicker than 5 mm, strength becomes sufficient as a matter of course, however, the weight of the foam composition structure becomes too heavy and the desired lightweight characteristic is lost. However, when the thickness of the metal sheet becomes thicker than 5 mm, occasionally, during cooling from foam temperature to room temperature stripping off of metal sheets from the foam or distortions of the layer shape by the tearing off of foam occurs. These facts are very closely related to the linear thermal expansion coefficient of metal sheet. When the thermal expansion coefficient of metal sheet is lower than $5 \times 10^{-6}$ per C° of higher than $20 \times 10^{-6}$ per C° whatever the thickness of metal sheet may be within the range of 0.05–5 mm, stripping off of metal sheets from the foam or tearing off of foam occurs during cooling from foam temperature to room temperature. Satisfactory metals for the present invention are in the category of iron, steel, copper and many other such alloys. But some iron alloys or copper alloys are useless for use in the present invention, because the linear thermal expansion coefficient is out of the range of the present invention. Zinc, lead, tin and many others in this category of alloys also cannot be used in the present invention. This is so because the linear thermal expansion coefficient of these metals is higher than $20 \times 10^{-6}$ per C°. However, in the present invention metal sheets of alloys in the category of iron, steel, copper, etc. surface treated with alloys in the category of zinc, lead, tin, etc. are useful. Generally, when the base metal is of a useful alloy in the present invention, almost all of the surface treated metals are useful.

In the present invention, when producing a foam composite structure, the use of a metal sheet with its edges bent more than 2 mm at an angle of more than 45° is recommended for the following reason. When the size of foam and metal sheet becomes very large, the flatness of the surface often becomes very rough; however, when a bent sheet is used, flatness of surface is almost always excellent. Therefore, in the present invention a bent angle is recommended, and preferably an angle bent more than 60°. Moreover, in the present invention, the use of metallic netting material is recommended as a substitute for one of the metal sheets when producing the foam composite structure possessing metal sheets on both faces of foam.

When metallic netting material is used as one of the facing materials in the present invention, the following results for example are obtained.
1. higher mechanical strength
2. large voids in the foam which make the quality of the product inferior are not produced.

The metallic netting materials used in the present invention is a sort of lath, a sort of rib-lath, a sort of expanded metal sheet or wire netting, etc. In the present invention, the thickness of the raw material of metallic netting materials is within the range of 0.05–5 mm, but preferably 0.1–3 mm. When the raw material becomes thinner than 0.05 mm there is very little reinforcing effect, and when the thickness of raw material becomes thicker than 5 mm, the product loses its lightweight characteristic and becomes costly.

The metallic netting materials which satisfy the conditions of the present invention are useful even when coated or plated by such other materials that the qualities of the foam composite structure are not failed by them; however, it is necessary that linear thermal expansion coefficients of base metals be within the range of $5 \times 10^{-6}$–$20 \times 10^{-6}$ per C° for the same reasons mentioned above.

In the present invention, the temperature range effective to make the raw material foam is 200°–600°C, and preferably 250°–450°C. When the temperature is lower than such range, satisfactory expansion does not occur. On the other hand, when the temperature is higher than 600° C, the shrinking of the foam sometimes occurs and hence such high temperatures are undesirable.

In this invention, it may be possible to add boron oxide, boric acid, phosphorous oxide, phosphoric acid, aluminium oxide, aluminium hydroxide, calcium oxide, calcium hydroxide or their salts etc., into the raw material of the foam, with the aim of improving the water or moisture resistance of the foam composite structure. But, from the point of view of balance of the properties of the foam, the quantity of these elements must be lower than 30 wt % in the raw material of foam, and lower than 10 wt %, preferably.

In this invention, with the aim of reinforcing the foam composite structure, adding of wire or fibre of an inorganic substance, such as steel wires and asbestos, etc., is possible.

The foam composite structure obtained by the method of the present invention may be secondary processed, such as cutting, surface treatment, pait coating, adhesion, lamination and overcoating etc.

The foam composite structure obtained by the present invention has many superior properties, such as high mechanical strength, lightweight, fire resistance, thermal stability, lower thermal conductivity, higher sound transmission loss, low cost, etc. conditions for construction materials. For this reason, it is expected to be useful in many fields.

The present invention is further illustrated by the following examples.

EXAMPLE 1

100 Parts of the lower class water soluble glass produced commercially (solution of sodium silicate of the molar ratio $SiO_2/Na_2O$ is 3.1 and the solid content is 38.7%) and 35 parts of siliceous sinter (geyserite) of which the water content is 4.5% at wet base were mixed at room temperature and then the mixture was reacted into sodium silicate at 95°C for 6 hrs. (A) of which the molar ration $SiO_2/Na_2O$ was 6.5 and water content was 89.7% at dry base. In the same manner, the water soluble glass, the siliceous sinter and water were mixed at room temperature to be sodium silicate (B) of which the molar ratio $SiO_2/Na_2O$ was 5 and water content was 200% at dry base.

Then (B) was coated by 0.015 g/cm² (average) on one of the surfaces of two zinc-coated steel sheets of which the size was 900 mm × 900 mm, the thickness was 0.25 mm and the linear thermal expansion coefficient was $12 \times 10^{-6}$ per C°. One of them was placed as the upper coated surface, into the frame of which the inner size was 920 mm × 920 mm, the thickness was 20 mm and then placed onto iron plate of which the size was 1,000 mm × 1,000 mm and thickness was 10 mm. Consequently, (A) was piled on it in such a quantity that density of the foam became 0.39/cm³ after expansion by heating. In this case (B) also has a similar effect to that of (A) as raw material for foam. For this reason, the quantity of (A) alone was determined on the basis of 9.2 kg to become the density of the foam to 0.3 g/cm³ from A and B together. Next another zinc-coated steel sheet was set, as to be (B) as the lower coated surface, and an iron plate which was the same as coal plate was placed, then two iron plates were bolted to compress said frame set up.

After the heating of this set for 3 hrs, the set was taken out from the furnace used for heating the set and cooled to room temperature. Then it was unbolted and the foam composite structure was taken out of the frame.

The adhesion of the foam and the zinc-coated steel sheets was so strong that these were never stripped off each other even when sent through the thermal repeating test between the condition 20°–100° C for 10 cycles. It was confirmed by swing pendulum impact test that the mechanical strength of the foam composite structure was excellent; it was not broken at 200 kg.cm.

EXAMPLE 2

On the occasion of preparation of (A) in Example 1, water was added to become sodium silicate (c) of which molar ratio $SiO_2/Na_2O$ was 6.5 and water content was 150% at dry base. The zinc-coated steel sheets which were like that used in Example 1, were used without coating B. Then they were piled up in the frame as follows: zinc-coated steel sheet/(c)/zinc-coated steel sheet, and iron plate. The frames were bolted in the same way as those of Example 1.

In this case also, zinc-coated steel sheets adhered firmly with foam, and consequently they were never stripped off each other.

The foam composite structure obtained in this example never cracked stratiformly in the foam bed, moreover its impact strength was stronger than 200 kg.cm.

EXAMPLE 3

The water soluble glass used in Example 1, diatomaceous earth and boric acid were mixed and reacted in the same manner as that for the production of (A) in xample 1, to be sodium silicate (D) of which molar ratio $SiO_2/Na_2O$ was 5, boron oxide content was 5% at dry base and the water content was 95% at dry base. Sodium silicate (E) of which molar ratio was 4.5 and water content was 200% at dry base was prepared in the same manner as that of (B) in Example 1. Then (E) was coated by 0.02 g/cm² (average) on one of the surfaces of two steel sheets of which the size was the same as the steel sheets used in Example 1, with the thickness being 1 mm and the linear thermal expansion coefficient being about $12 \times 10^{-6}$ per C°. Consequently, one of the steel sheets was placed as to be as the frame used in Example 1, thickness was 30 mm, and then (D) was piled up on it as the density of foam 0.3 g/cm³ with (D) and (E) together after expansion by heating. Another steel sheet was set, as (E) lower coated surface on it. An iron plate was placed on it, then frame and plate were bolted.

The set prepared by the aforementioned manner was heated at 350°C for 3 hrs in an electric furnace and made the sodium silicate to foam. After removing the set from the furnace, cooling to room temperature was carried out, and then it was unbolted in order to take out the foam composite structure. The adhesion of foam and the zinc-coated steel sheets was so strong that these were never stripped off each other even during the thermal repeating test mentioned in Example 1.

By the impact test used in Example 1, it was also confirmed that mechanical strength of the foam composite structure was excellent.

REFERENTIAL EXAMPLE 1

Example 2 was repeated using the zinc sheets of which the linear thermal expansion coefficient was about $40 \times 10^{-6}$ per C° with the zinc sheets being zinc-coated steel sheets. However, the foam and zinc sheets were stripped off each other or the foam was cracked stratiformly when the frame and the plates were unbolted. It was clear that they do not produce a perfect composite structure with alkaline silicate.

EXAMPLE 4

Example 2 was repeated using the stainless steel sheets of which linear thermal expansion coefficient was about $17 \times 10^{-6}$°C, with the stainless steel sheets being zinc-coated.

As a result, good foam composite structure was obtained which had no stripping off and no stratiform cracking and possessed an impact strength no higher than 200 kg.cm.

EXAMPLE 5

EXAMPLE 1 was repeated using the copper sheets of a thickness of 0.4 mm and linear thermal expansion coefficient of about $17 \times 10^{-6}$ per C°, and 9.3 kg of (A) to be the density of foam to 0.5, except for using steel sheets of a thickness of 0.25 mm and linear thermal expansion coefficient of $12 \times 10^{-6}$ per C° and 9.2 kg of (A).

As a result, good foam composite structure was obtained without stripping off and without stratiform cracking and its impact strength was higher than 200 kg. cm.

EXAMPLE 6

Example 1 was repeated using the steel sheets of a linear thermal expansion coefficient of $11.5 \times 10^{-6}$ per C°, with the steel sheet being the zinc-coated steel sheet which had piled up on (A) in Example 1.

As a result, good foam composite structure was obtained without stripping off and without stratiform cracking and its impact strength was over 10 times higher than foam alone.

REFERENTIAL EXAMPLE 2

Example 10 was repeated using the zinc sheet of a linear thermal expansion coefficient of $40 \times 10^{-6}$ per C°, except the zinc sheet was the zinc-coated steel sheet which had piled up on (A) in Example 1.

As a result, although the zinc-coated steel sheet attached tightly to the foam, the zinc sheet was stripped off perfectly.

EXAMPLE 7

Iron frame of a thickness of 20 mm, a width of 30 mm and an inner size of 1,020 mm × 2,500 mm was placed on a coal plate having a thickness of 10 mm and a size of 1,200 mm × 2,600 mm. Zinc-coated steel sheet (F) was set into the frame of which the size was 1,020 mm × 2,500 mm, thickness was 0.6 mm, the linear thermal expansion coefficient was $12 \times 10^{-6}$ per C° and the four edges were bent in height by 18 mm as shown in FIG. 1.

(B) was coated onto said zinc-coated steel sheet (F) in the same quantity as Example 1, then 28.75 kg of (A) was piled up on it to make density of foam of 0.3. They were covered by a zinc-coated steel sheet of a thickness of 0.27 mm and of a size and linear thermal expansion coefficient the same as in (F).

Then a plate which was the same as coal plate was placed on them, and they were so bolted to each other as to sandwich the frame. The set prepared by said operation was heated at 350°C for 5 hrs in the electric furnace to foam the sodium silicate.

As a result, the foam composite structure obtained was very excellent. It was confirmed that the adhesion of the foam and surface materials was so tight that stripping off or cracking did not occur even during the thermal repeating test. Mechanical strength was very high, as for example, higher than 300 kg. cm of impact strength.

Added to these excellent effects, the surface of this foam composite structure, especially the side to which bent zinc-coated steel sheet was used, was very flat.

To evaluate the flatness of the surface, flaw marks were set up, 2 marks for the large hollow and 1 mark for the small hollow. The flaw marks for the foam composite structure obtained in this Example was 1.0 in a ten-time tracing test. Moreover, the flaw marks were almost exclusively in the upper surface.

EXAMPLE 8

Figure 2:
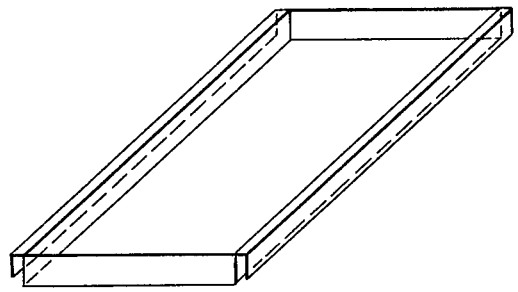
FIG. 2, represents a modified form of the layered article of the present invention.

Zinc-coated steel sheet (G) was used as a substitute for zinc-coated steel sheet (F) used in Example 7. The edges of zinc-coated steel sheet of (F) were bent by 18 mm in height and by 2–20 mm in width as shown in FIG. 2. In this case (A) was put into the inside of the box part of (G) to become the density of foam to 0.3. Other operations were carried out same as Example 7.

The purposes of using the bent sheet as shown in FIG. 2 are to achieve the surface flatness despite of the spilling out of the raw material of the foam and of the deformation of the product and simplification in use of the product on the occasion of construction, namely, bent parts are useful as connecting elements.

The foam composite structure obtained from the method mentioned above was excellent; namely, adhesion was very tight, the spilling out of raw material and the hollow was not seen. The flaw mark of the surface was 0, and on the occasion of the use in construction of this foam composite structure, it was very effective to connect the connecting parts.

The test for impact strength of this foam composite structure showed a value higher than 300 kg. cm.

REFERENTIAL EXAMPLE 4

Using zinc sheets (linear thermal expansion coefficient of $40 \times 10^{-6}$ per C°, lead sheets (linear thermal expansion coefficient of $20 \times 10^{-6}$ per C° or others with linear thermal expansion coefficients out of the range of the claim, various sorts of foam composite structures have been produced by the method given in the examples; however, it became clear that it was impossible to adhere the foam and such metal sheets as mentioned above at the same time when making foam, especially in the large size available for practical use, and for the reason they were almost stripped off each other while the foam composite structures were being cooled from foaming temperature to room temperature.

EXAMPLE 9

The methods for the production of foam composite construction was studies in order not to bring out caves or voids in the foam and to raise the mechanical strength using metallinetting materials (H) of a linear thermal expansion coefficient of $12 \times 10^{-6}$ per C°, as a substitute for the zinc-coated steel sheet which was given in Example 7 to be laid on the sodium silicate.

In this case, the quantity of A was so determined as to become the density of foam 0.3 g/cm³ with the revision of the volume of the metallic netting material, and H on which the application of B is optional, was placed on A. The direction for producing the foam composite construction was almost similar to that of Example 7 except as related above.

As a result the adhesion of foam to G was very tight, and that of foam to H was also good and stripping off did not occur throughout the thermal repeating test between the high and low temperatures. This was caused by both the high adhesion characteristics of the metallic netting material to the foam and their biting effect, for the metallic netting material was buried into the surface of the foam.

Then, none of the caves or the voids in the foam which were mentioned above could be seen. The reason for this effect of the netting material on the foam was the steam generated from the raw material of the foam by heating could easily get out of the foam composite construction through the openings of the metallic netting material. The experiment was repeated 20 times for each of the 7 types of H shown in the following table 1, the results of which were similar to those related above.

Table 1

| Metallic netting material | Long span of opening (mm) | Short span of opening (mm) | Thickness of raw metal (mm) |
| --- | --- | --- | --- |
| 1  lath (flat) | 18 | 32 | 0.5 |
| 2  lath (flat) | 18 | 32 | 0.27 |
| 3  rib lath (A2 in JIS) | — | — | 0.5 |
| 4  rib lath (A2 in JIS) | — | — | 0.27 |
| 5  expanded metal | 22 | 52 | 1.6 |
| 6  expanded metal | 34 | 80 | 1.6 |
| 7  expanded metal | 34 | 80 | 2.3 |

Then the swing-pendulum impact tests (span was 900 mm) and bending tests (span was 800 mm) were done, and consequently the relationship of the 7 types of H with the opening size, the strand size and the thickness of the raw metal sheet for the metallic netting material as shown in the following table 2 were determined.

Table 2

| Sample No. | Bending strength (Kg/cm$^2$) | Impact strength (Kg. cm) |
|---|---|---|
| 1 in the table 1 | 62 | 272 |
| 2 in the table 1 | 50 | 251 |
| 3 in the table 1 | 105 | 347 |
| 4 in the table 1 | 79 | 305 |
| 5 in the table 1 | 138 | 447 |
| 6 in the table 1 | 73 | 353 |
| 7 in the table 1 | 88 | 407 |

Then, it was possible to choose the most suitable netting material according to the desired purposes. By using the metallic netting material, the merits of the foam composite construction, for example, light weight, non-flammability, fire resistance, low thermal conductivity, high sound transmission loss, and so on, were always obtained.

The following is claimed:

1. A foam composite structure made by heating a piled up formation of alkaline silicate layer/metal sheet in which the molar ratio of alkaline silicate $SiO_2/R_2O$ (R: Na and/or K) is 4–8, the water content of alkaline silicate is 20–170% based upon non-volatile materials, the thickness of the metal sheet is 0.05–5 mm and the linear thermal expansion coefficient of the metal sheet is $5 \times 10^{-6}$–$20 \times 10^{-6}$ per C°.

2. A foam composite structure according to claim 1 wherein said alkaline silicate, molar ratio and water content is sodium silicate, $SiO_2/Na_2O = 4.5$–7, and 50–150%, respectively.

3. A foam composite structure according to claim 1 wherein the heating temperature for foaming of raw material is 200°–600° C.

4. A foam composite structure according to claim 1 wherein the metal sheet is bent more than 2 mm from the edge at an angle of more than 45°.

5. A foam composite structure according to claim 1 wherein the metal sheet is bent more than 5 mm from the edge at an angle of more than 60°.

6. A foam composite structure according to claim 1 wherein the piled up formation is metallic netting material/alkaline silicate layer/metal sheet in which the linear thermal expansion coefficient of the metallic netting material is $5 \times 10^{-6}$–$20 \times 10^{-6}$ per C°.

* * * * *